US010123178B2

(12) United States Patent
Mankovskii et al.

(10) Patent No.: US 10,123,178 B2
(45) Date of Patent: Nov. 6, 2018

(54) MAPPING DEVICES TO A PHYSICAL SPACE

(71) Applicant: CA, Inc., New York, NY (US)

(72) Inventors: Serguei Mankovskii, Morgan Hill, CA (US); Steven L. Greenspan, Scotch Plains, NJ (US); Maria Cecilia Velez Rojas, Santa Clara, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/251,284

(22) Filed: Aug. 30, 2016

(65) Prior Publication Data
US 2018/0063681 A1 Mar. 1, 2018

(51) Int. Cl.
*H04L 29/06* (2006.01)
*H04W 4/04* (2009.01)
*H04W 12/06* (2009.01)
*H04W 4/02* (2018.01)

(52) U.S. Cl.
CPC ........... *H04W 4/043* (2013.01); *H04L 63/107* (2013.01); *H04W 4/023* (2013.01); *H04W 4/026* (2013.01); *H04W 12/06* (2013.01)

(58) Field of Classification Search
CPC .............................. H04W 4/043; H04L 63/107
USPC ................................... 455/419, 404.2, 456.1
See application file for complete search history.

(56) References Cited

U.S. PATENT DOCUMENTS

| | | | |
|---|---|---|---|
| 6,865,347 B2 | 3/2005 | Perkins et al. | |
| 9,730,075 B1 | 8/2017 | Shavell et al. | |
| 2002/0089722 A1* | 7/2002 | Perkins | G01S 1/70 398/140 |
| 2003/0221006 A1 | 11/2003 | Kuan et al. | |
| 2004/0203908 A1* | 10/2004 | Hind | H04W 64/00 455/456.1 |
| 2015/0195682 A1* | 7/2015 | Lee | H04W 4/04 455/456.1 |
| 2015/0382198 A1 | 12/2015 | Kashef et al. | |

OTHER PUBLICATIONS

Brewster, "Internet of Things: The 'ghosts' that haunt the machine", BBC Future, [online] retrieved on May 25, 2016 from <http://www.bbc.com/future/story/20140413-why-ghosts-haunt-the-internet>, Apr. 14, 2014, 12 pages.

(Continued)

*Primary Examiner* — Chuck Huynh
(74) *Attorney, Agent, or Firm* — Gilliam IP PLLC

(57) ABSTRACT

Determining the physical location of wirelessly connected devices within a network can provide a number of security benefits. However, manually determining and configuring the physical location of each device within a system can be burdensome. To ease this burden, devices within a network are equipped with a location detection sensor that is capable of automatically determining a device's location in relation to other devices within the network. A location detection sensor ("sensor") may include a light source, a light direction sensor, a rangefinder, and a radio or wireless network interface. Two location detection sensors can perform a location detection process to determine their relative locations to each other, such as the distance between them. As more sensors are added to a network, a sensor management system uses the relative locations determined by the sensors to map the sensors to a physical space layout.

20 Claims, 9 Drawing Sheets

(56) References Cited

OTHER PUBLICATIONS

Wang, et al., "On-chip sensor for light direction detection", Optics Letters, vol. 38, No. 22, retrieved on Jun. 8, 2016 from <https://www.researchgate.net/publication/259252455_On-chip_sensor_for_light_direction_detection>, Nov. 15, 2013, 5 pages.

* cited by examiner

MAPPING DEVICES TO A PHYSICAL SPACE

BACKGROUND

The disclosure generally relates to the field of computer systems, and more particularly to determining physical locations of devices within a system.

The proliferation of wirelessly connected devices, such as laptops, desktops, mobile devices, and Internet of Things ("IOT") devices, has increased the number of devices to configure within a network. In some instances, especially instances involving IOT devices like motion detectors, fire alarms, etc., an administrator may be required to manually determine and enter the physical location of each device and register each device within a wireless network. Additionally, the use of wireless networks has created security issues in that sensitive data may be sent over networks that expand and can be detected outside of a physical boundary, such as an office building. Wardriving is a method for harvesting information about wireless devices and networks using a moving wireless device that sweeps an area, such as a wireless device in a car or drone. Wardriving may involve mapping the location wireless local area networks and accessing the networks to retrieve data or gain illegal access to a system. Some protections against wardriving involve securing a wireless network with login credentials; however, in some instances, the login credentials may be guessed or determined through a brute force attack.

BRIEF DESCRIPTION OF THE DRAWINGS

Embodiments of the disclosure may be better understood by referencing the accompanying drawings.

DESCRIPTION

Figure 1:
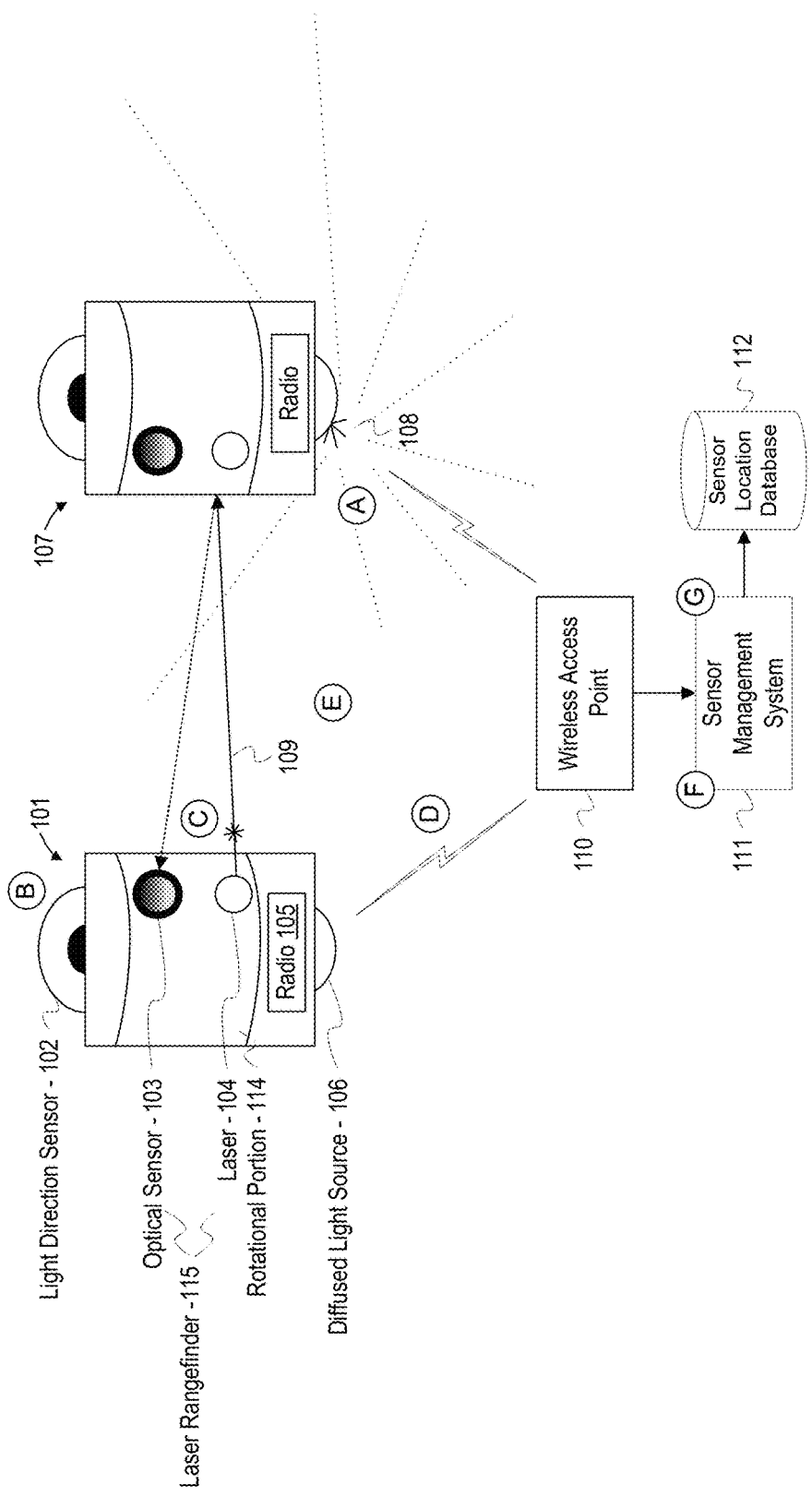
FIG. 1 depicts an example location detection sensor performing a location detection process with another location detection sensor.

The description that follows includes example systems, methods, techniques, and program flows that embody aspects of the disclosure. However, it is understood that this disclosure may be practiced without these specific details. For instance, this disclosure refers to coupling location detection sensors to IOT devices and information technology resources in illustrative examples. But aspects of this disclosure can be applied to coupling location detection sensors to generic physical objects in order to map or track their locations within a physical space. In other instances, well-known instruction instances, protocols, structures, and techniques have not been shown in detail in order not to obfuscate the description.

Overview

Determining the physical location of wirelessly connected devices within a network can provide a number of security benefits. However, manually determining and configuring the physical location of each device within a system can be burdensome. To ease this burden, devices within a network are equipped with a location detection sensor that is capable of automatically determining a device's location in relation to other devices within the network. A location detection sensor ("sensor") may include a light source, a light direction sensor, a laser rangefinder, and a radio or wireless network interface. Two location detection sensors can perform a location detection process to determine their relative locations to each other, such as the distance between them. As more sensors are added to a network, a sensor management system uses the relative locations determined by the sensors to map the sensors to a physical space layout. As a device attempts to connect to the network, the sensor management system can use existing sensors to determine the new device's location and determine whether the device is within the physical space. If the sensor management system determines that the new device is outside of the physical space, the sensor management system may determine that a wardriving attempt is in progress and deploy security measures to mitigate the wardriving attempt.

Terminology

The description below uses the term "location detection sensor" to describe a device capable of detection and determining its position relative to other location detection sensors. A location detection sensor may be a discrete device or may be a component embedded within another device. For example, a location detection sensor may be embedded in a smartphone or laptop. Additionally, functionality and components may vary across location detection sensors. For example, some location detection sensors may be equipped with a light direction sensor that can detect a direction of light, while others may include light detection sensors that can detect the presence of light but not its direction.

The description below uses the term "rangefinder" to describe a component or collection of components that are capable of measuring a distance from a first object to a second object. The description primarily refers to laser rangefinders, which are rangefinders that use a laser beam to determine a distance to an object; however, the term rangefinder may encompass any type of non-contact distance measurement technology. For example, a rangefinder may measure distance using vision-based stereoscopic methods, beam splitting, echolocation techniques, vibrations, etc. Additionally, multiple rangefinders may be used to determine distance or a device's location through triangulation. In such implementations, the rangefinders may include antennas that are capable of detecting a wireless signal from a device being measured.

Example Illustrations

Figure 2:
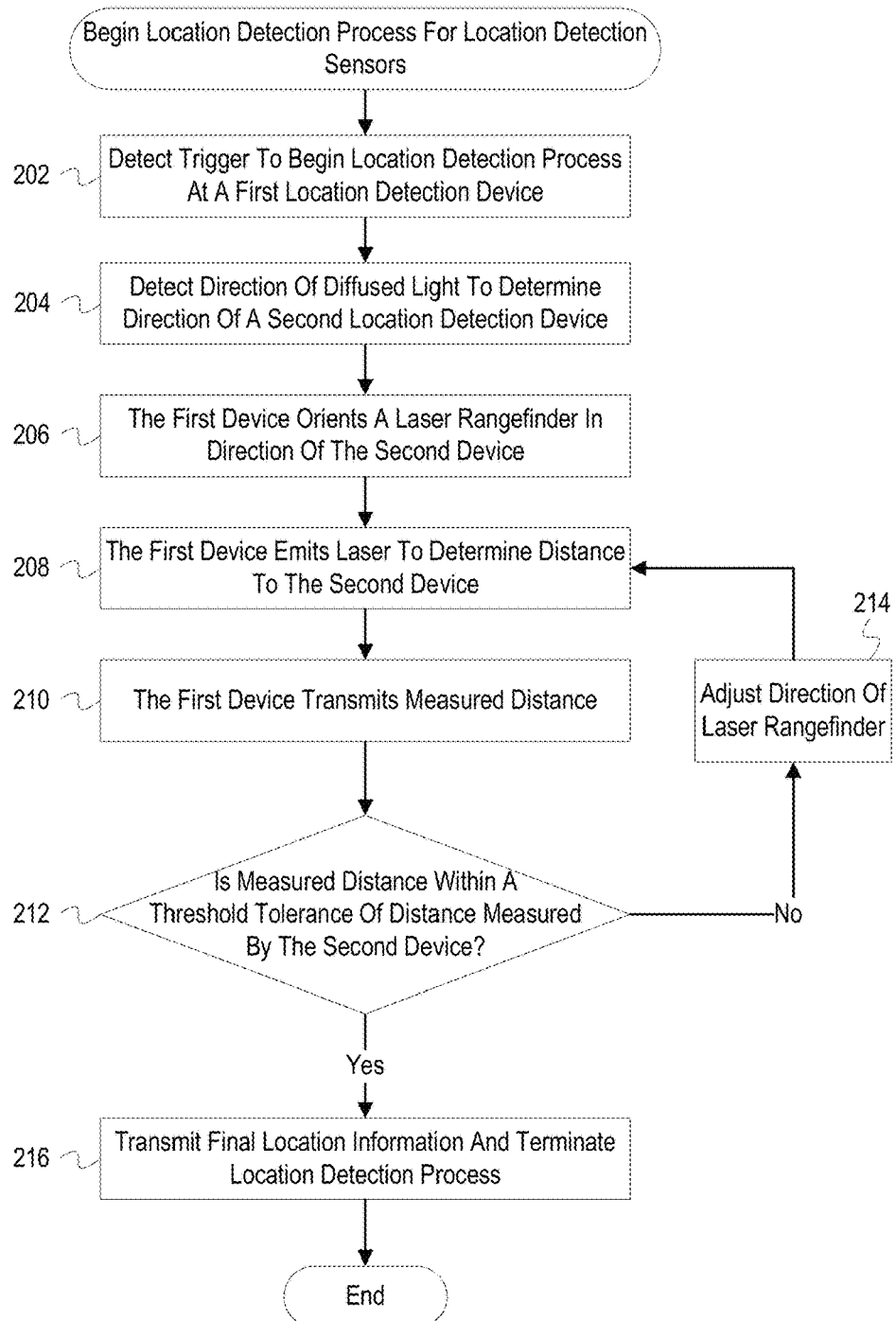
FIG. 2 depicts a flow diagram with example operations for performing a location detection process among location detection sensors.
Figure 3:
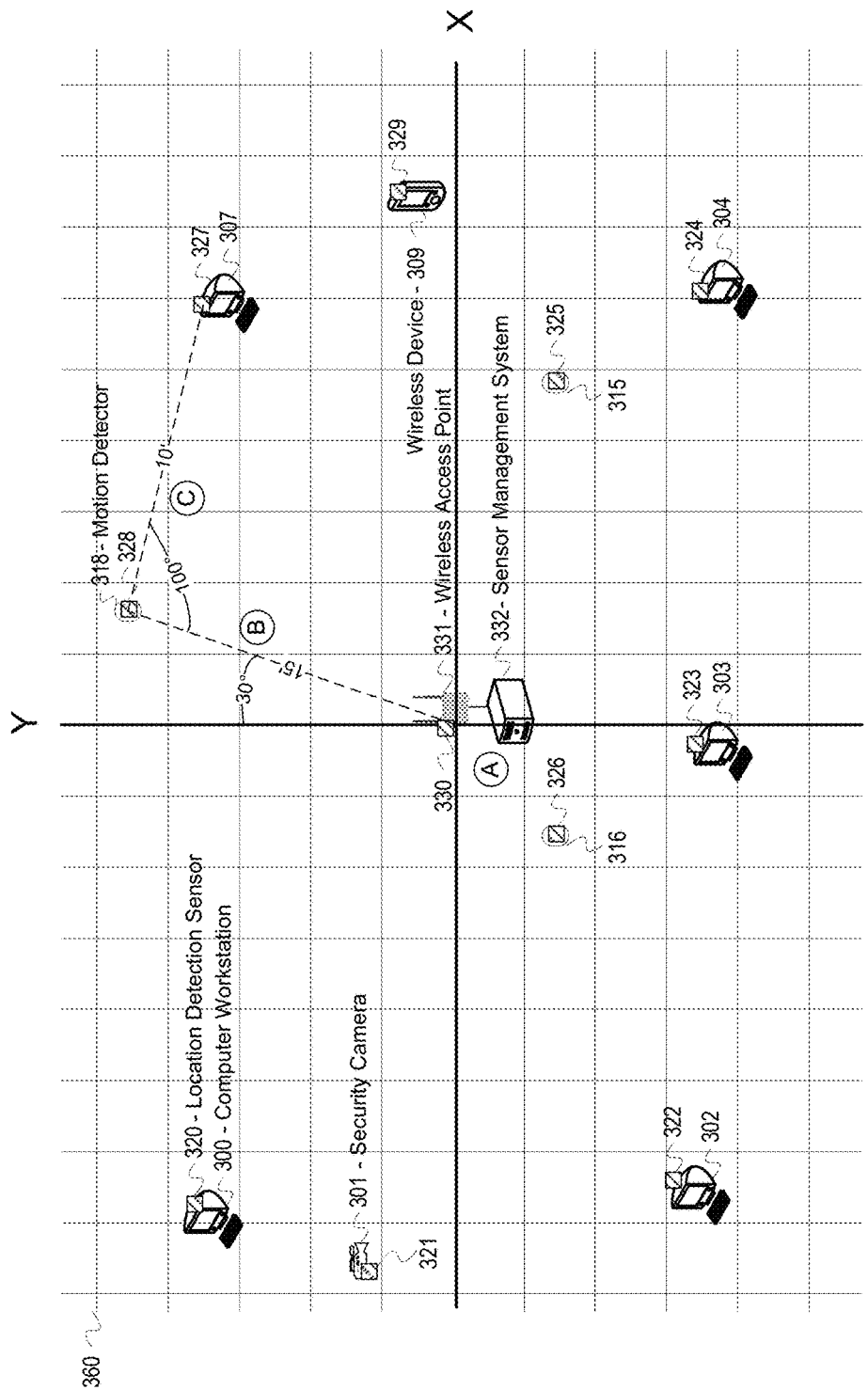
FIG. 3 depicts a layout of sensors within a coordinate grid as determined by a sensor management system.
Figure 4:
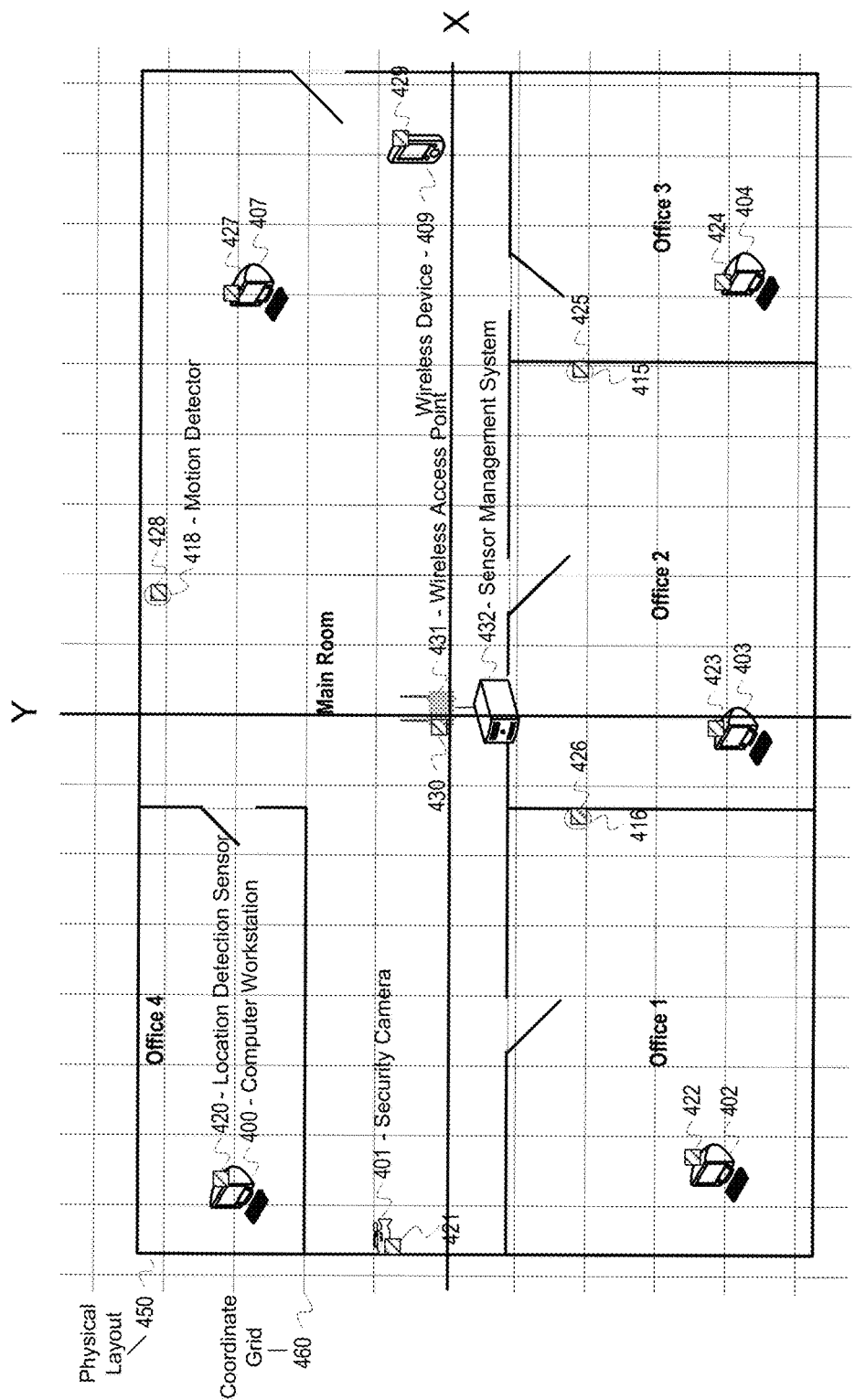
FIG. 4 depicts a mapping of sensor locations within a coordinate grid to a physical space layout.
Figure 5:
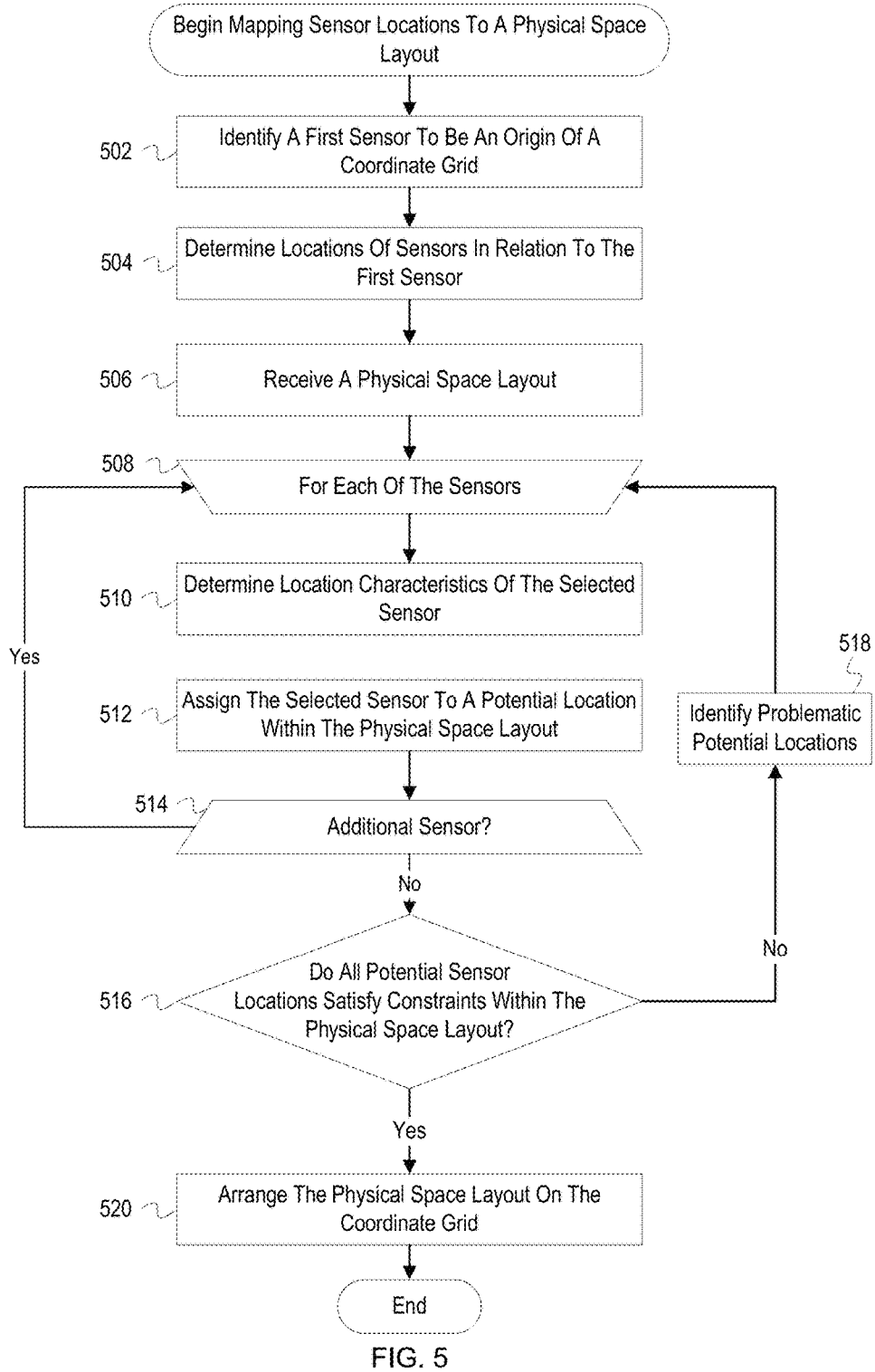
FIG. 5 depicts a flow diagram with example operations for mapping sensor locations to a physical space layout.
Figure 6:
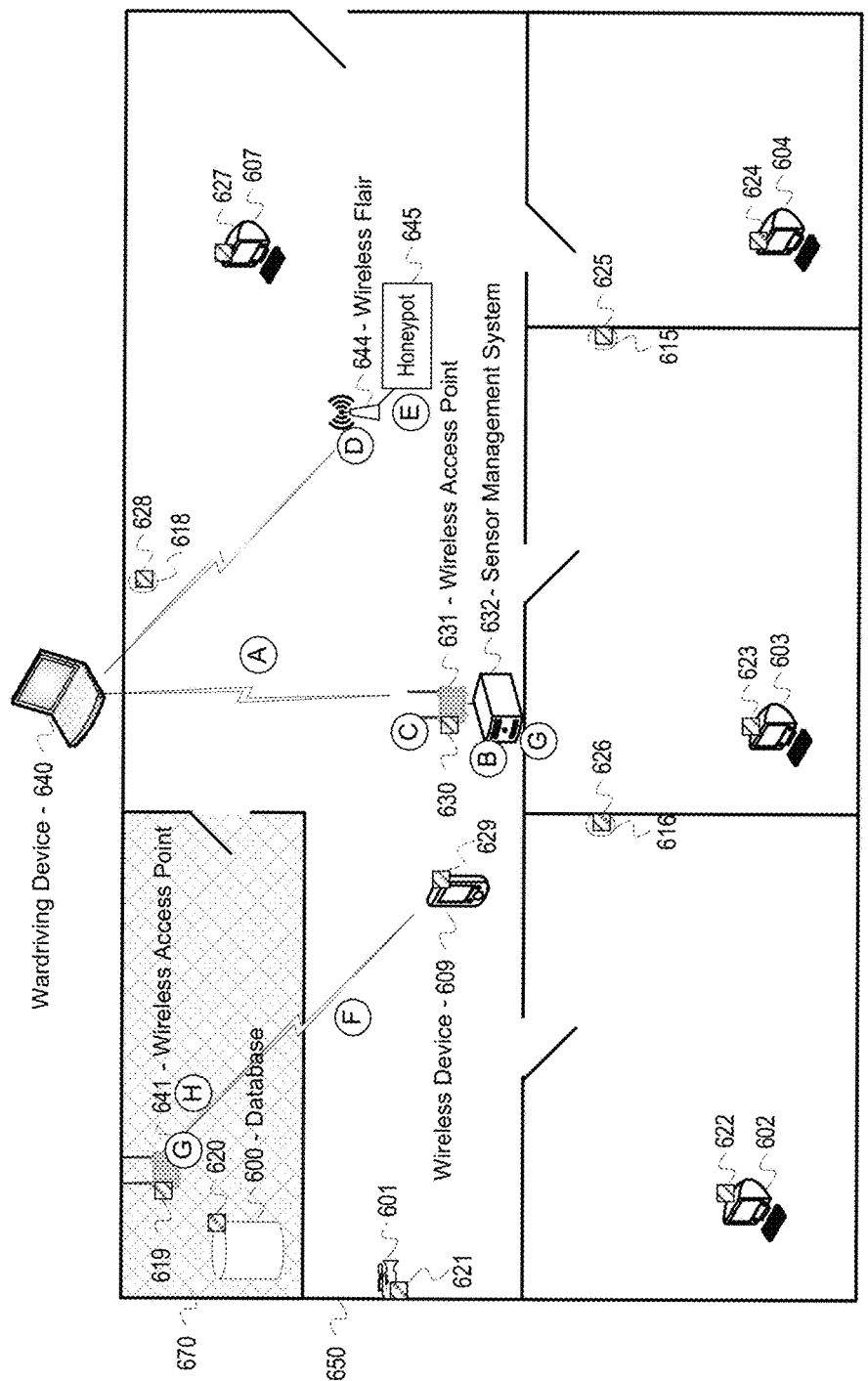
FIG. 6 depicts an example system for detecting and mitigating wardriving attempts.
Figure 7:
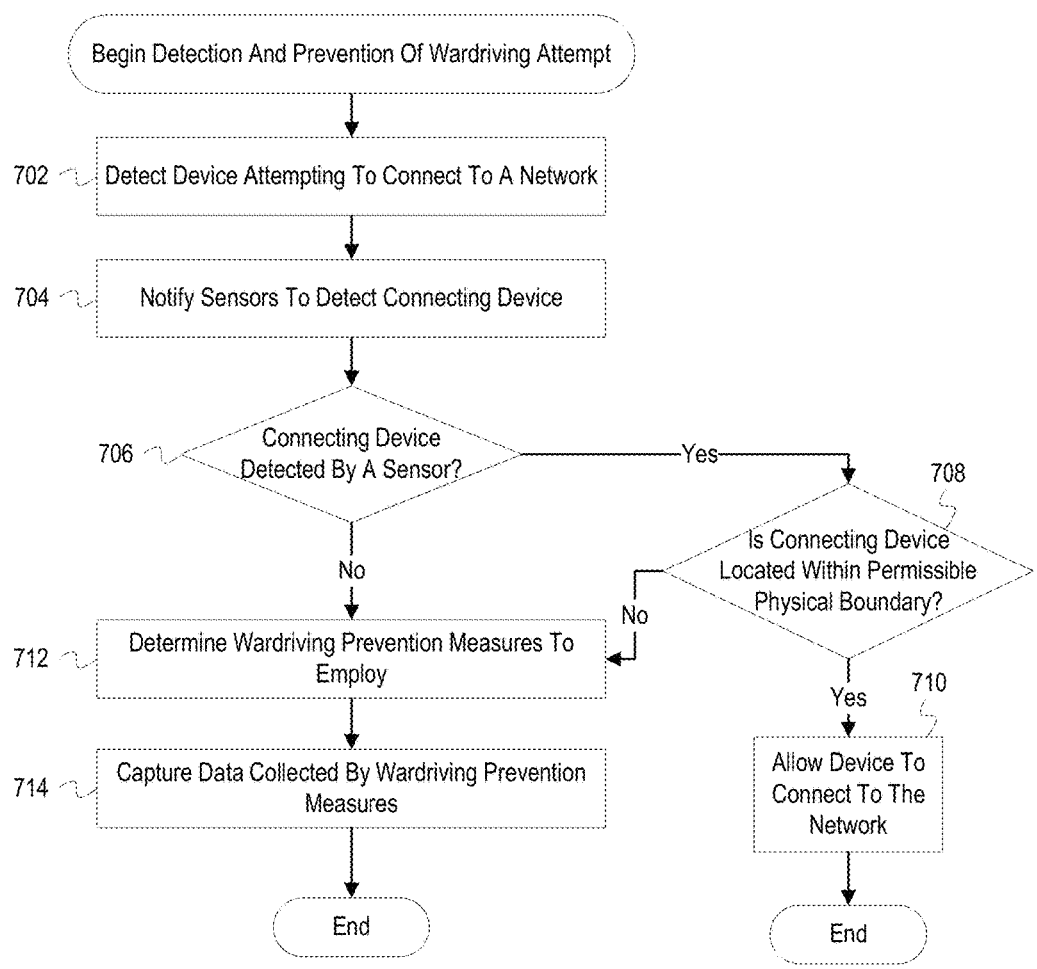
FIG. 7 depicts a flow diagram with example operations for detecting and mitigating wardriving.

FIGS. 1 and 2 describe a location detection sensor capable of determining its location in relation to other location detection sensors. FIGS. 3-5 describe a process for mapping location detection sensors to locations within a physical space. FIGS. 6 and 7 describe a system for detecting and mitigating wardriving attempts using location detection sensors.

Location Detection Sensor

FIG. 1 depicts an example location detection sensor performing a location detection process with another location detection sensor. FIG. 1 depicts a location detection sensor 101 ("sensor 101"), a location detection sensor 107 ("sensor 107"), a wireless access point 110, a sensor management system 111, and a sensor location database 112. The sensor 101 includes a light direction sensor 102, a laser rangefinder 115, a radio 105, and a diffused light source 106. The laser rangefinder 115 comprises an optical sensor 103 and a laser emitter 104. The sensor 107 includes components similar to the components of the sensor 101 which are not labeled to avoid obfuscating the description.

In the illustration of FIG. 1, the sensor 101 is an existing sensor that has been previously configured. The sensor 101 may be part of a plurality of sensors (not depicted) that are connected within a network. The sensor 107 has not been configured and is being added to the network and registered with the sensor management system 111.

FIG. 1 is annotated with a series of letters A-G. These letters represent stages of operations. The stages A-G below describe one embodiment of a location detection process that is performed between an existing sensor and a new sensor that is being configured or registered within a network. Although these stages are ordered for this example, the stages illustrate one example to aid in understanding this disclosure and should not be used to limit the claims. Subject matter falling within the scope of the claims can vary with respect to the order and some of the operations.

At stage A, the sensor 107 emits diffused light 108 from a diffused light source incorporated within the sensor 107 to begin a location detection process with the sensor 101. The sensor 107 may emit the diffused light 108 and begin the location detection process in response to initiation of a set up or configuration process. The configuration process may be triggered as a result of powering on the sensor 107 or a device to which the sensor 107 is connected for a first time. Alternatively, the configuration process may be triggered by a button on the sensor 107 being pressed. In some implementations, the configuration process may be initiated by the sensor management system 111. The sensor management system 111 may transmit a message to the sensor 107 via the wireless access point 110 to initiate the configuration process. During the configuration process, the sensor 107 may perform the location detection process with the sensor 101 as well as other sensors within a line of sight of the sensor 107. The sensor 107 may emit the diffused light 108 for a period of time or may continue emitting the diffused light 108 until the sensor 107 receives a message that the diffused light 108 was detected by the sensor 101.

At stage B, the sensor 101 detects the direction of the diffused light 108 source using the light direction sensor 102. The light direction sensor 102 is an optical sensor capable of detecting the originating direction of diffused light. The light direction sensor 102 may include a number of photodiodes and integrated circuits along with structures, such as baffles, slits, mirrors, various apertures, etc., to aid in detecting the direction of diffused light. In some implementations, the sensor 101 may include multiple light direction sensors to cover a wider field of view, such as a 180 degree view or 360 degree view, and to determine a three-dimensional location of the source of the diffused light 108. The light direction sensor 102 may determine the direction of the light to be in coordinates or degrees relative to a determined origin position of the sensor 101. For example, the light direction sensor 102 may indicate that the diffused light 108 is originating from a direction that is located 90 degrees in a horizontal axis and 135 degrees in a vertical axis away from the origin position of the sensor 101. In some implementations, the sensor 101 may include a gyroscope to determine its orientation, and the light direction sensor 102 may indicate the direction of the light relative to the position determined by the gyroscope.

Alternatively, the sensor 101 may use the optical sensor 103 to detect the direction of the sensor 107. The sensor 101 may use the optical sensor 103 to determine in which direction the diffused light 108 is the brightest. The sensor 101 can assume that the direction in which the diffused light 108 is the brightest is the direction of the light source on the sensor 107. In some implementations, the sensor 101 may employ object recognition software to identify the sensor 107 or a unique feature on the sensor 107, such as a distinct shape or logo, to determine the sensor's 107 direction.

At stage C, the sensor 101 orients the laser rangefinder 115 in the direct of the sensor 107 and uses the laser rangefinder 115 to determine the physical distance to the sensor 107. The sensor 101 uses the position coordinates of the diffused light 108 determined by the light direction sensor 102 to orient the laser rangefinder 115. As depicted in FIG. 1, the sensor 101 has a rotational portion 114 that allows for rotation of the optical sensor 103 and the laser emitter 104 along a horizontal axis. In some implementations, other mechanical means may be used to rotate the optical sensor 103 and the laser emitter 104 in both a horizontal and vertical direction. In other implementations, mirrors may be used to reflect the laser 109 in the direction determined by the light direction sensor 102 and to redirect light into the optical sensor 103. To determine the distance to the sensor 107, the sensor 101 measures the time between emitting the laser 109 with the laser emitter 104 and detecting the reflection of the laser 109 at the optical sensor 103. The distance between the sensor 101 and the sensor 107 is equal to the speed of light multiplied by the travel time of the laser 109 and then divided by 2.

In some implementations, instead of emitting the laser 109, the sensor 101 may determine the distance to the sensor 107 based on stereoscopic pictures taken with the optical sensor 103. Alternatively, the sensor 101 may use other non-contact distance measuring techniques, such as confocal sensors or draw-wire displacement sensors.

At stage D, the sensor 101 transmits the determined distance to the sensor management system 111 through the wireless access point 110. The sensor 101 uses the radio 105 to transmit the determined the distance. The radio 105 includes hardware, such as an antenna and a network interface card, which allows the sensor 101 to communicate with the wireless access point 110. The radio 105 may communicate using a number of hardware communication standards, such as variations of Institute of Electrical and Electronics Engineers (IEEE) 802.11, IEEE 802.15.1 (Bluetooth), ZigBee, Z-Wave, etc. In some implementations, the radio 105 may communicate with a hub (not depicted) that is connected to the wireless access point 110. The hub may be used to translate messages sent using protocols such as ZigBee and Z-Wave into an Internet Protocol (IP) format that is compatible with the wireless access point 110.

After transmitting the determined distance to the sensor management system 111, the sensor 101 beings emitting diffused light (not depicted) using the diffused light source 106, similar to the sensor 107 at stage A. The sensor 101 may emit the diffused light after transmitting the distance to the sensor management system 111 or in response to various triggers, such as detecting the diffused light 108 from the sensor 107 or receiving a message from the sensor management system 111.

At stage E, once the diffused light emitted by the sensor 101 is detected by the sensor 107, the sensor 107 performs operations similar that performed by the sensor 101 at stages B-D. The sensor 107 uses its light direction sensor to detect the direction of the light originating from the sensor 101, orients its laser and optical sensor, and emits a laser to measure the distance between the sensor 101 and the sensor 107.

At stage F, the sensor management system 111 compares the distance determined by the sensor 101 to the distance determined by the sensor 107. In some implementations, the location detection process may be completed after the sensor 101 transmits the determined distance at stage D. However, the measured distances may be inaccurate to due reflections of light, tolerances in components such as the light direction sensor 102 and the optical sensor 103, etc. To ensure the accuracy of the measured distance, the sensor management system 111 compares the measured distances and ensures that the distances match or are within a threshold difference of each other. If the distances do not match, the sensor management system 111 transmits a message to the sensor 101 and the sensor 107 to make adjustments and continue performing the location detection process. In response to receiving the message from the sensor management system 111, the sensor 101 and the sensor 107 may adjust the position of their laser rangefinders and determine a distance to the other sensor from the new position. The newly determined measurements are sent to the sensor management system 111 and the comparison operations of stage F are repeated.

Once the distances are the same or are within a tolerance of each other, the sensor management system 111, at stage G, stores the distances in the sensor location database 112. The sensor location database 112 contains a record for each sensor in the network that indicates its position relative to other sensors within the network that are within a direct line of sight or an indirect line of sight of a sensor. In FIG. 1, a record in the sensor location database 112 for the sensor 101 would indicate that the sensor 101 is the determined distance away from the sensor 107. The record may also include information such as the directionality information of the diffused light 108 determined by the light direction sensor 102. For example, the record may include an angle at which the sensor 101 oriented the laser rangefinder 115 to measure the distance to the sensor 107.

In some implementations, the sensor 101 may transmit configuration information to the sensor 107 in response to detecting the sensor 107. The configuration information may include information related to the wireless access point 110, such as an IP address or network credentials. Additionally, the configuration information may include operating parameters, such as the frequency with which the sensor activates its light direction sensor, emits diffused light, etc.

FIG. 2 depicts a flow diagram with example operations for performing a location detection process among location detection devices. FIG. 2 refers to a location detection sensor as performing the operations for naming consistency with FIG. 1.

A first location detection sensor ("the first sensor") detects a trigger to begin location detection process with a second sensor (202). The trigger to begin the location detection process may be an indication sent by a sensor management system, a button pressed on the first sensor, detection of the second sensor attempting to join a network to which the first sensor is connected, detection of a light source from the second sensor, or detection of a device identifier or other message sent through modulated light. For example, when the sensor management system detects that the second sensor is attempting to connect to the network, the sensor management system may broadcast a message to existing sensors in the network to begin the location detection process. In response to detecting the trigger, the first sensor may enable its light direction sensor to detect diffused light from the second sensor. Additionally, the first sensor may respond to the sensor management system to indicate that the location detection process has been initiated. The sensor management system may then send a message to the other sensors in the network to stop attempting to initiate the location detection process with the second sensor. Once the first sensor and second sensor have finished the location detection process, the sensor management system may again send a message to the other sensors to initiate the location detection process. Then other sensors within line of sight of the second sensor may begin the location detection process.

The first sensor detects a direction of diffused light emitted by a second location detection sensor ("the second sensor") (204). The first sensor may be configured to only detect light of a specified wavelength in order to prevent interference from other ambient light not originating from a sensor. Similarly, the second sensor may include a light source that is configured to emit light of the specified wavelength. Alternatively, the second sensor may modulate the light to allow the first sensor to distinguish the light from ambient light. For example, the second sensor may modulate the light to include data such as a device identifier. The first sensor uses the light direction sensor to determine the direction of the light originating from the second sensor.

Using the direction determined by the light direction sensor, the first sensor orients laser rangefinder including a laser and optical sensor in the direction of the second sensor (206). The first sensor may be equipped with a rotational portion that allows for orientation of the laser and the optical sensor. Alternatively, the first device may be equipped with a parabolic mirror(s) that allows for the laser to be targeted toward a specified direction and allows for the laser's reflection to be detected by the optical sensor.

The first sensor emits a laser to determine distance to the second sensor (208). The first sensor uses the optical sensor to detect the time taken for the laser to reflect off of the second sensor and return to the first sensor. Using this measurement, the first sensor determines the distance between itself and the second sensor. In some instances, due to barriers such as walls, the first sensor may detect the diffused light emitted by the second sensor but not be within a direct line of sight of the second sensor. In such instances, the first sensor may be unable to detect a reflection of the emitted laser and, therefore, be unable to determine the distance to the second sensor. When the first sensor cannot determine a distance, the first sensor may report that it is not within a direct line of sight of the second sensor to the sensor management system and end the location detection process. The sensor management system then records that the first sensor and second sensor are located near each other but are divided by a barrier.

The first sensor transmits measured distance to a sensor management system (210). The sensor management system records the distance of the sensors in relation to one another. The sensor management system may ensure accuracy of measured distance by comparing the distances measured by the first and the second sensors. The sensor management sensor compares the distance measured by the first sensor to a distance measured by the second sensor and determines whether the distances match or are within a threshold tolerance of each other. For example, the sensor management system may accept measured distances that differ by 5%. In some implementations, the first sensor may transmit the measured distance to the second sensor instead of or in addition to the sensor management system. The first sensor may transmit the measured distance to the second sensor through modulating a diffused light source, modulating the laser, or communicating through radios. Additionally, the first sensor may receive a measured distance from the second sensor.

The first sensor determines whether the measured distance is within a threshold tolerance of the distance measured by the second sensor (212). The first sensor may receive a message from the sensor management system which indicates whether the measured distance is within the threshold tolerance. In some implementations, the first sensor performs the comparison itself based on a measured distance received from the second sensor. The first sensor may be configured with the threshold tolerance or may receive a threshold tolerance in a configuration file from the sensor management system.

If the distance measured by the first sensor is not is within a threshold tolerance of the distance measured by the second sensor, the first sensor adjusts the direction of the laser rangefinder (214). The first sensor may again activate its light direction sensor to detect the direction of the second sensor and then adjust the laser and the optical sensor based on the newly detected direction. In some implementations, the first sensor may be programmed to iteratively adjust the direction of the laser and the optical sensor in a pattern. The first sensor may be programmed to transmit or compare a measured distance after each measurement or may take multiple measurements at once and determine the proper measurement based on comparisons with distances measured by the second sensor. After adjusting the laser and the optical sensor, the first sensor again emits a laser to determine a distance to the second sensor (208).

If the distance measured by the first sensor is within a threshold tolerance of the distance measured by the second sensor, the first sensor ends the location detection process (216). The first sensor resumes normal operation, and the final measured distance is stored by the sensor management system.

Mapping Location Detection Sensors

FIG. 3 depicts a layout of sensors within a coordinate grid as determined by a sensor management system. FIG. 3 depicts a coordinate grid 360 which depicts location detection sensors 320-330 ("the sensors"), a wireless access point 331, and a sensor management system 332. The sensors are coupled with physical devices and are used to aid in the mapping of the location of the physical devices within the coordinate grid 360. The sensors 320, 322, 323, 324, and 327 are coupled to computer workstations 300, 302, 303, 304 and 307, respectively. The sensor 321 is coupled to a security camera 301. The sensors 325, 326, and 328 are coupled to motion detectors 315, 316, and 318, respectively. The sensor 329 is coupled to a wireless device 309, and the sensor 330 is coupled to the wireless access point 331.

The sensors may be attached to the physical devices using a variety of methods, such as adhesive, connected via a security slot, or other mechanical attachment technique. In some implementations, the sensors may be embedded within the device itself. For example, the computer workstation 300 may include a sensor incorporated within a monitor. As an additional example, the wireless device 309 may be a smartphone that has been modified to include additional components, such as a laser or a light direction sensor, necessary for the sensor 329 to function. Furthermore, the sensor 329 may utilize a camera and a flash of the wireless device 309 to function as an optical sensor and a diffused light source. Sensors embedded within a device may share other resources with the device such as processors, memory, storage, and power. Standalone sensors that cannot utilize resources of a device may include a processor, memory, and storage and may be powered by a battery or other power source, such as a solar panel. In some implementations, instead of a processor, the sensors may include specialized hardware designed to perform the location detection process.

In addition to being coupled to the physical devices, the sensors are associated with the devices in software by storing a mapping of an identifier for a sensor along with an identifier of a physical device to which the sensor is coupled. For example, an identifier for the sensor 320 may be associated with a Media Access Control (MAC) address of the computer workstation 300 in the sensor management system 332. The mapping between sensor and device identifiers is then used to determine the locations of the physical devices as the locations of the coupled sensors within the coordinate grid 360 are determined.

FIG. 3 is annotated with a series of letters A-G. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the sensor management system 332 establishes the origin of the coordinate grid 360. The origin of the coordinate grid 360 may be based on a sensor whose location and directionality are manually determined and recorded in the sensor management system 332. The determined location and directionality of the sensor are later used to map the coordinate grid 360 to a physical space layout as described in more detail in FIG. 4. In FIG. 3, the origin of the coordinate grid 360 is based on the location of the sensor 330 coupled to the wireless access point 331. The location of the sensor refers to its physical location within a space, such as a building or outdoor environment.

The direction of the x and y axes of the coordinate grid 360 may be based on compass directions, such as north or west, or based on an orientation of a physical space which contains the sensors. For example, the x axis may be configured to be parallel to a wall in the physical space, and they axis is then determined to be perpendicular to the x axis. The sensor 330 may be manually oriented to the direction of the x axis by rotating a laser of the sensor 330 to point along the x axis. The sensor 330 then records the direction of the laser as the x axis and may later determine the location of other sensors in relation to their degrees difference from the x axis. In instances where a compass direction is used for axes, the sensor 330 may determine the axes using a gyroscope within the sensor 330 or other device capable of determining compass directions. As the sensor 330 performs the location detection process with other sensors, the sensor 330 may share configuration information with the sensors such as the determined directions of the x and y axes.

At stage B, the sensor management system 332 begins mapping sensors by initiating a location detection process between the sensor 330 and the sensor 328. The sensor management system 332 may initiate the location detection process by sending a message to the sensor 330 and the sensor 328. Alternatively, the location detection process may be initiated in response to the sensor 330 detecting diffused light from the sensor 328. The location detection process between the sensors is performed in a manner similar to that described in FIG. 2. The location of the other sensors 320-329 within the coordinate grid 360 are determined in relation to the location and directionality of the sensor 330. As depicted in FIG. 3, the sensor 330 determines that the sensor 328 is located 30 degrees to the right of what has been configured for the sensor 330 as the y axis. Additionally, the sensor 330 determines that the distance to the sensor 328 is 15 feet. The sensor 330 reports this information to the sensor management system 332 which records the information in records for the sensor 330 and the sensor 328. The sensor management system 332 also determines a location of the sensor 328 within the coordinate grid 360 based on the distance and directionality of the sensor 328 in relation to the sensor 330. For example, the sensor management system 332 may determine polar coordinates for the sensor 328.

At stage C, the sensor management system 332 initiates a location detection process between the sensor 328 and the sensor 327. To initiate the location detection process, the sensor management system 332 broadcasts a message to the sensor 330 and the sensor 328 to enable their light direction sensors to detect a new sensor. The sensor 328 detects diffused light from the sensor 327 and reports to the sensor management system 332 that the location detection process had been initiated. The sensor 328 and the sensor 327 then perform the location detection process and determine that they are located 10 feet away from each other. The sensor 328 may further determine that the directionality of the sensor 327 is 100 degrees away from the direction of the sensor 330. Using this information, the sensor management system 332 can determine coordinates for the sensor 327 despite the sensor 327 not having performed a location detection with the sensor 330. The sensor management system 332 can determine the distance from the sensor 330 based on the distance between the sensor 330 and the sensor 328 and the distance between the sensor 328 and the sensor 327.

As the other sensors connect to the wireless access point 331, the sensor management system 332 continues initiating the location detection process among the sensors to complete the mapping process. Sensors on portable devices, such as the sensor 329 on the wireless device 309, may be configured to periodically emit diffused light so that the portable device's location may be tracked. Each time the light is emitted the sensor 329 may perform the location detection process with a nearby sensor. Alternatively, the wireless device's 309 location may be approximated based on which sensors detected light from the sensor 329.

In some instances, a sensor may not have a direct line of sight to another sensor whose location has already been determined. The sensor management system 332 may notify an administrator of connected sensors whose locations have not been determined. The administrator may then manually configure the locations of one or more of the sensors. In general, the mapping process can be completed as long as at least one sensor has been manually configured in each discrete physical space that lacks a line of sight to another already configured physical space.

FIG. 4 depicts a mapping of sensor locations within a coordinate grid to a physical space layout. FIG. 4 depicts a coordinate grid 460 which depicts location detection sensors 420-430 ("the sensors"), a wireless access point 431, and a sensor management system 432 that have been mapped onto a physical space layout physical space layout 450. The sensors are coupled with physical devices and are used to aid in the mapping of the location of the physical devices within the coordinate grid 460. The sensors 420, 422, 423, 424, and 427 are coupled to computer workstations 400, 402, 403, 404 and 407, respectively. The sensor 421 is coupled to a security camera 401. The sensors 425, 426, and 428 are coupled to motion detectors 415, 416, and 418, respectively. The sensor 429 is coupled to a wireless device 409, and the sensor 430 is coupled to the wireless access point 431.

The physical space layout 450 is input into the sensor management system 432. The physical space layout 450 may be expressed in a schematic that includes dimensions of rooms and may also include locations of physical features, such as doors and windows, and names of rooms within the physical space layout 450. In some implementations, an administrator may draw the physical space layout 450 on the coordinate grid 460 in relation to the dimensions of the coordinate grid 460. An administrator may locate the physical space layout 450 on the coordinate grid 460 according to the physical location of the sensor 430 which has been determined to be the origin of the coordinate grid 460. Alternatively, the physical space layout 450 may include GPS coordinates for three or more points of the layout, such as corners of the building. Using these GPS coordinates, the sensor management system 432 can use GPS coordinates for the sensor 430 to determine the location of the sensor 430 in relation to the defined points of the layout and orient the physical space layout 450 along the determined axes of the coordinate grid 460. The sensor management system 432 orients the physical space layout 450 by determining the distance of the sensor 430 to the at least three GPS locations defined in the physical space layout 450.

In some instances, the exact physical location of the sensor 430 or origin of the coordinate grid 460 in relation to the physical space layout 450 may be unknown. In such instances, the process of arranging the physical space layout 450 in the correct location on the coordinate grid 460 involves solving a constraints satisfaction problem. Constraints satisfaction problems involve determining a solution that satisfies a number of constraints or limitations for a set of objects. In the context of FIG. 4, solving the constraints satisfaction problem involves determining an arrangement of the physical space layout 450 on the coordinate grid 460 that satisfies the constraints of the sensors. The constraints for the sensors can include distances and angles between the sensors, whether two sensors are within a line of sight of each other, and any manually configured location characteristics, such as GPS coordinates or assignments to particular rooms in the physical space layout 450. For example, the sensor management system 432 may determine that the sensor 422 is located in Office 1 based on the fact that the computer workstation 402 is assigned to Office 1.

The sensor management system 432 iterates through the sensors and determines potential locations for the sensors within the physical space layout 450 based on their constraints or location characteristics. For example, the sensor management system 432 may select the sensor 421 and retrieve its location characteristics, which may include its distances from the sensor 430, the sensor 428, and the sensor 427. Based on these distances, the sensor management system 432 may determine that the sensor 421 is located within the main room of the physical space layout 450 since no other room has dimensions large enough to satisfy the total distance between the sensor 421 and the sensor 427. Based on the determination that the sensor 421 is located in the main room, the sensor management system 432 may determine sensors that are not located in the room by identifying the sensors, such as the sensor 424, which are not within line of sight of the sensor 421. The sensor management system 432 then continues to iterate through the sensors until a potential location, i.e. a location that satisfies the constraints for each sensor, has been determined.

Once the arrangement of the sensors within the physical space layout 450 has been determined, the sensor management system 432 may label the location of the sensors with names of the rooms in the physical space layout 450 or location characteristics of the sensors. For example, the sensor management system 432 may label the sensor 428 with the room name "Main Room" and a characteristic of "exterior wall" or "on the perimeter." To label the sensors, the sensor management system 432 may associate the label with a record for the sensor in a database. Labelling the sensors with their locations allows for the sensor management system 432, or another monitoring system connected to the sensor management system 432, to produce location specific alerts for the devices coupled to the sensors. For example, if the motion detector 416 detects motion, the sensor management system 432 can produce an alert indicating that motion has been detected in the Office 1.

Furthermore, the sensor management system 432 can assign the sensors and their associated devices to groups based on their physical locations. In FIG. 4, the sensor management system 432 may assign sensors and devices in the Office 1 and the Office 2 to a first group and assign sensors and devices in the Office 3 and the Office 4 to a second group. The sensor management system 432 in coordination with another device such as the wireless access point 431 may route traffic from a device differently based on whether the device is in the first group or the second group. For example, devices in the first group may back up data to a first storage system, and devices in the second group may back up data to a second storage system. As an additional example, a security system connected to the wireless access point 431 may perform an action, such as turn on the security camera 401, each time a motion detector in the Main Room detects motion and may perform a different action for motion detectors in other device groups. The sensor management system 432 may also configure devices differently based on their groups. For example, the sensor management system 432 may send configuration information to sensors in a first group that instructs them to connect to a first wireless access point and may send configuration information to other sensors to connect to a second wireless access point.

FIG. 5 depicts a flow diagram with example operations for mapping sensor locations to a physical space layout. FIG. 5 refers to a sensor management system as performing the operations for naming consistency with FIGS. 3 and 4 even though identification of program code can vary by developer, language, platform, etc.

A sensor management system ("system") identifies a first sensor to be an origin of a coordinate grid (502). The system may identify the first sensor based on the first sensor being an initial sensor added to a network, receiving an identifier from an administrator or configuration file, or randomly selecting the first sensor from sensors available in a network. The system can use the first sensor as the origin of the coordinate grid even if the physical location of the first sensor is unknown.

The system determines locations of the sensors in the network (504). The system may determine the locations of the sensors as each sensor is added to the network, or the system may iterate through the existing sensors to initiate the location detection process for each sensor. The system may determine the sensors locations as coordinate pairs determined in relation to the first sensor's location at the origin of the coordinate grid. In some implementations, the system may not use a coordinate grid and may merely record a sensor's location characteristics, such as distances to other sensors with which the sensor performed the location detection process, sensors which the sensor was able to detect but unable to perform the location detection process, sensors which the sensor was unable to detect, and other location information like a room assignment.

The system receives a physical space layout (506). The physical space layout delineates boundaries and features of a building, such as walls, doors, windows, floors, etc. For example, the physical space layout may indicate that a buildings total dimensions are 30 feet by 20 feet with three rooms that are each 10 feet by 20 feet. In some instances, the physical space layout may include a virtual boundary to divide devices in a room or outdoor space into groups. So, even if sensors and their associated devices share a room, the sensors can be divided into groups using the virtual boundaries.

The system iterates for each of the sensors to map the sensor locations to the physical space layout (508). The sensor currently being iterated over is hereinafter referred to as the "selected sensor."

The system determines location characteristics of the selected sensor (510). The system may retrieve the location characteristics from a database where the location characteristics were recorded during the location detection process. The system may query the database using an identifier for the selected sensor. The location characteristics for the selected sensor may include information such as distances and directions to other sensors with which the selected sensor performed the location detection process, sensors which the selected sensor was able to detect but unable to perform the location detection process, sensors which the selected sensor was unable to detect, and manually input location information like a room assignment. For example, the selected sensor may be assigned to a hallway, be 20 feet away from a first sensor, and be 30 feet away from a second sensor that is located at a 180 degree angle from the direction of the first sensor.

The system assigns the selected sensor to a potential location within the physical space layout (512). The system analyzes the location characteristics of the selected sensor to determine constraints, such as a minimum room size for the selected sensor. For example, using the distances of the first sensor and the second sensor in the example above, the system may determine that the selected sensor must be located within a hallway that is at least 50 feet long (30 feet+20 feet at a 180 degree angle away from each other). As an additional example, the selected sensor may have a location characteristic of being able to detect a third sensor. When a sensor can detect another sensor but not complete the location detection process, the system can assume that the sensors are located near each other but not within a direct line of sight. Using this characteristic, the system can determine that the selected sensor may be located near a door or corner of the physical space layout that would meet the constraint of the selected sensor being near to, but not in direct line of sight of, the third sensor. Once the system has determined the constraints from the location characteristics, the system can analyze the physical space layout to identify a location that satisfies the constraints. In some implementations, the system determine a list of potential locations and narrow down the list as potential locations for other sensors are determined.

The system determines whether there is an additional sensor (514). If there is an additional sensor, the system selects the next sensor (508). If there is not an additional sensor, the system determines whether all potential sensor locations satisfy constraints within the physical space layout (516). The system may again analyze each sensor to determine whether its location characteristics, especially characteristics involving distances to other sensors, are satisfied. The system may also analyze the potential locations to determine whether each location falls within the boundaries of the physical space layout.

If all potential sensor locations do not satisfy the constraints and location characteristics, the system identifies the problematic locations (518). The system may identify potential sensor locations that fall outside of the physical space layout or sensors whose constraints or location characteristics were not satisfied. After identifying the problematic locations, the system repeats the process of identifying potential locations for the sensors (508). The system may maintain a list of potential locations for each of the sensors that have been attempted in order to avoid trying the same potential position again on subsequent iterations.

Once the system determines that the potential locations satisfy the constraints of the sensors and the physical space layout, the system analyzes the location of the sensors within the physical space layout and determines additional location characteristics for the sensors (520). For example, the system may determine that a sensor is located on the outside wall of the physical space layout and label the sensor as "on the border" or "on the perimeter."

Wardriving Detection and Mitigation

FIG. 6 is annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 6 depicts an example system for detecting and mitigating wardriving attempts. FIG. 6 depicts location detection sensors 619-630 ("the sensors"), a wireless access point 631, a wireless access point 641, a wireless flare 644, a honeypot 645, and a sensor management system 632 within a physical space 650. The sensor 620 is coupled to a database 600. The sensors 622, 623, 624, and 627 are coupled to computer workstations 602, 603, 604 and 607, respectively. The sensor 621 is coupled to a security camera 601. The sensors 625, 626, and 628 are coupled to motion detectors 615, 616, and 618, respectively. The sensor 629 is coupled to a wireless device 609, the sensor 619 is coupled to the wireless access point 641, and the sensor 630 is coupled to the wireless access point 631.

At stage A, the wardriving device 640 attempts to connect to the wireless access point 631. The wardriving device 640 is depicted as a laptop in FIG. 6 but may be other devices, such as a mobile device, tablet, or other portable computing device. The wardriving device 640 is located outside of the physical space 650 and may be located within a vehicle or be attached to a transportation device, such as a drone or remote controlled car. The wardriving device 640 is equipped with software and hardware that enables the device to search for SSIDs and connect to wireless networks. In some implementations, the wardriving device 640 may attempt to emulate a device known within the network such as the computer workstation 607 by emulating the computer workstation's 607 MAC address or Internet Protocol address. The wardriving device 640 may also be equipped with software for determining login credentials or other techniques for hacking into a network. The wireless access point 631 may detect that the wardriving device 640 is attempting to connect based on the wardriving device 640 requesting to lease an IP address from the wireless access point 631 or submitting login credentials with a request for access.

At stage B, the sensor management system 632 broadcasts a message to the sensors to determine whether the wardriving device 640 has a sensor and is visible within the physical space 650. Whenever a device attempts to connect to the wireless access point 631, the wireless access point 631 may query the sensor management system 632 to determine whether the device is visible and within the physical space 650. In response, the sensor management system 632 broadcasts a message to cause the sensors in the network to turn on their light direction sensors and determine whether a new sensor is detectable. The broadcast message may be sent through the wireless access point 631 or may be sent using another protocol such as Z-Wave, Bluetooth, or Zigbee. The sensor management system 632 may also send a message to cause any unregistered sensors to turn on their diffused light sources. As a result, if the wardriving device 640 is equipped with a sensor and is attempting to impersonate an authentic device, the sensor on the wardriving device 640 will begin emitting light and may be detected by one of the existing sensors within the network. If a sensor of the wardriving device 640 is detected by one of the sensors, the sensor management system 632 then causes the sensors to perform the location detection process to determine the location of the wardriving device 640. The sensor management system 632 then notifies the wireless access point 631 of the location of the wardriving device 640 and may also determine whether the wardriving device 640 is located outside of the physical space 650.

If the wardriving device 640 cannot be detected, either because it is not equipped with a sensor or because a sensor of the wardriving device 640 is not visible by the sensors within the network, the sensor management system 632 notifies the wireless access point 631 that the wardriving device 640 could not be detected. In FIG. 6, the wardriving device 640 is not equipped with a sensor, so the sensor management system 632 reports to the wireless access point 631 that the wardriving device 640 could not be detected.

At stage C, the wireless access point 631 broadcasts a message to devices to cease broadcasting SSIDs and transmitting messages in response to detection of a wardriving attempt. Because the wardriving device 640 could not be detected by the sensors, the wireless access point 631 determines that the device wardriving device 640 is nefarious and begins deploying wardriving measures. One potential measure is silencing SSID broadcasts during a wardriving attempt. The wireless access point 631 stops broadcasting its SSID, and the wireless access point 641 stops broadcasting its SSID in response to receiving the message from the wireless access point 631. Similarly, the other devices within the network, such as the computer workstations, may terminate their wireless connections and stop transmitting data.

At stage D, the wireless flare 644 is activated and begins broadcasting an SSID. A wireless flare is a device that emits a fake SSID to serve as a distraction during a wardriving attempt. A network may be equipped with multiple wireless flares and each wireless flare may emit multiple fake SSIDs. Additionally, the wireless access point 631 and the wireless access point 641 may be configured to emit fake SSIDs during wardriving attempts. Wireless flares, in addition to emitting fake SSIDs, may be used to notify other devices within their network of the wardriving attempt. The wireless flare 644 is activated in response to the broadcast message received from the wireless access point 631 at stage C.

At stage E, the wardriving device 640 connects to the wireless flare 644 and is forward to the honeypot 645. Although the SSID is fake, the wireless flare 644 allows a device to connect to the SSID for purposes of capturing data from the device such as a MAC address or other data transmitted by the device, such as login credentials. Additionally, the wireless flare 644 forwards the device to the honeypot 645 in order to determine a potential target of the wardriving attempt. The honeypot 645 contains fake information that is made to appear legitimate with the purpose of convincing a hacker that his or her wardriving attempt has been successful. Additionally, the honeypot 645 records which information is taken by the hacker so that the target of the wardriving attempt may be determined.

The wardriving mitigation measures above are employed until it has been determined that the wardriving attempt is over and that the network may again resume operation securely. Typically, wardriving attempts are performed by devices outside of a physical. However, similar wardriving mitigation techniques may be used to prevent devices within a physical space from accessing network for which they are not authorized. The physical space 650 includes a secure room 670 which includes the database 600 coupled to the sensor 620 and the wireless access point 641 coupled to the sensor 619. The database 600 is accessible through the wireless access point 641 but contains sensitive that is only devices within the secure room 670 are authorized to access. As a result, the wireless access point 641 must ensure that a device is within the secure room 670 before allowing the device to connect.

At stage F, the wireless device 609 attempts to connect to the wireless access point 641. The wireless device 609 may submit login credentials to the wireless access point 641 as part of connecting to the wireless access point 641. However, due to the employed security measures, the wireless access point 641 determines whether the wireless device 609 is within the secure room 670 regardless of whether proper login credentials are supplied.

In response to the connection attempt, at stage G, the wireless access point 641 requests that the sensor management system 632 determine whether the wireless device 609 is located within the secure room 670. The wireless access point 641 may send an identifier for the wireless device 609 to the sensor management system 632, such as the MAC address of the wireless device 609. The sensor management system 632 uses the identifier for the wireless device 609 to determine that the wireless device 609 is coupled to the sensor 629. The sensor management system 632 then sends a message to the sensor 629 instructing the sensor 629 to turn on its diffused light source. Also, the sensor management system 632 broadcasts a message to the other sensors to enable their light direction sensors to determine whether the sensor 629 is visible. In FIG. 6, the sensor 630 may detect the sensor 629 and notify the sensor management system 632 that the sensor was detected. The sensor management system 632 then identifies the location of the sensor 630, which may be recorded in a database, and determines that the sensor 630 is not within the secure room 670. Based on this determination and the fact that the sensor 629 is visible to the sensor 630, the sensor management system 632 determines that the wireless device 609 is not within the secure room 670 and notifies the wireless access point 641.

At stage H, the wireless access point 641 denies access to the wireless device 609. Because the wireless device 609 is not located within the secure room 670, the wireless access point 641 denies the access request of the wireless device 609. In some instances, the wireless access point 641 may notify an administrator of the attempted access request.

If the sensor 629 is detected by the sensor 619 or the sensor 620 at stage G, the sensor management system 632 determines that the wireless device 609 is within the secure room 670 and notifies the wireless access point 641. Because the wireless device 609 is within the secure room 670, the wireless access point 641 allows the wireless device 609 to connect and access the database 600.

FIG. 7 depicts a flow diagram with example operations for detecting and mitigating wardriving. FIG. 7 refers to a sensor management system as performing the operations for naming consistency with the Figures above even though identification of program code can vary by developer, language, platform, etc.

A sensor management system ("system") detects a device attempting to connect to a network (702). The system may receive a message from a wireless access point indicating that a new device is attempting to connect. In some implementations, the system may be embedded with hardware and software to serve as the sensor management system and a wireless access point. In such implementations, the system itself detects the connecting device.

The system notifies sensors in the network to detect the connecting device (704). The system broadcasts a message to the sensors within the network to activate their light direction sensors or optical sensors to attempt to detect diffused from the connecting device. In some instances, the system may also transmit a message to the connecting device to instruct the device to enable its diffused light source, assuming it is equipped with one. In some implementations, devices coupled with sensors may be configured to automatically enable their diffused light source when attempting to connect to a network.

The system determines whether the connecting device was detected by a sensor (706). If a sensor detects diffused light, the sensor notifies the system that the connecting device was detected. The sensors in the network may keep their light direction sensors or optical sensors enabled for a period of time and may notify the system whether diffused light was detected during the time period. If the connecting device is not equipped with a sensor, the sensors will be unable to detect the connecting device. Similarly, if the connecting device is not configured to use a similar communication protocol as the system, the connecting device will not receive the system's instruction to enable its diffused light source, and the sensors may be unable to detect the connecting device.

If the connecting device was detected by a sensor, the system determines whether the connecting device is located within permissible physical boundary (708). A permissible physical boundary is a physical boundary that a device must be located within to be authorized to connect to the network. In some implementations, the permissible physical boundary may actually be a virtual boundary that was defined within the physical space layout. The system may determine the location of the connecting device based on which sensors detected the diffused light from the connecting device. In some instances, the system may also request from the sensors the originating direction of the diffused light. For example, if a sensor which detected the diffused light was labeled an "on the perimeter" sensor, the system may request the direction of the diffused light to determine whether the light was detected within or outside of a permissible physical boundary. If the connecting device was only detected by sensors internal to a permissible physical boundary, the system may determine that the connecting device is located within a permissible physical boundary.

If the system determines that the connecting device is located within a permissible physical boundary, the system allows the device to connect to the network (710). The system may notify a wireless access point that the connecting device is authorized to connect. Alternatively, the system may notify the wireless access point of the location of the device, and the wireless access point then determines whether to allow the connecting device to connect. In some implementations, the system may only allow the connecting device restricted access to the network until the connecting device is configured. For example, the system may prevent the connecting device from accessing databases in the network. Once restricted access is granted, the system or a location detection sensor that detected the connecting device may send configuration information to the connecting device. Once the connecting device is configured, the system may remove the access restrictions on the connecting device.

If the system determines that the connecting device is not detected by a sensor or if the system determines that the connecting device is not located within a permissible physical boundary, the system determines that a wardriving attempt is in progress and determines which wardriving mitigation measures to employ (712). Depending on the configured level of security, the system may adjust the amount and complexity of the wardriving mitigation measures. In lower security environments, the system may notify an administrator of the attempt and notify wireless access points within the network to cease broadcasting SSIDs. In higher security environments, the system may send messages to enable wireless flares, honeypots, etc. The system may enable a number of wireless flares to broadcast multiple SSIDs each corresponding to a different wireless protocol. For example, the system may configure a first wireless flare to broadcast a 5 gigahertz network with no security enabled and a second wireless flare to broadcast a 2.4 gigahertz network with Wi-Fi Protected Access (WPA) security enabled. The system may then be able to determine hardware and software capabilities of the connecting device based on which network the connecting device attempts to access. If a location of the connecting device was determined but was determined not be within a permissible physical boundary, the system may determine which wardriving mitigation measures to employ based on the connecting devices location. If the connecting device was detected within a building, the system may also enable automated, physical security systems, such as locks, flashing lights, etc.

The system captures data collected by wardriving mitigation measures (714). The system may record data such as a location of the connecting device, an identifier for the connection device, any potential targets of the connecting device as determined by a honeypot system, any credentials tried by the connecting device, etc. The system may also record any capabilities of the connecting device, such as detected hardware, communication protocols, whether a brute force attack or other hacking methods were attempted, etc.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 502-506 of FIG. 5 and blocks 712 and 714 of FIG. 7 can be performed in parallel or concurrently. Additionally, the operation depicted in block 208 of FIG. 2 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Some operations above iterate through sets of items, such as sensors. In some implementations, sensors may be iterated over according to an ordering of sensors, an indication of sensor importance, sensors' locations within a physical space or a coordinate grid, etc. Also, the number of iterations for loop operations may vary. Different techniques for determining sensor locations within a physical space may require fewer iterations or more iterations. For example, multiple sensors may be analyzed and their locations determined in parallel.

The variations described above do not encompass all possible variations, implementations, or embodiments of the present disclosure. Other variations, modifications, additions, and improvements are possible. As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a standalone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
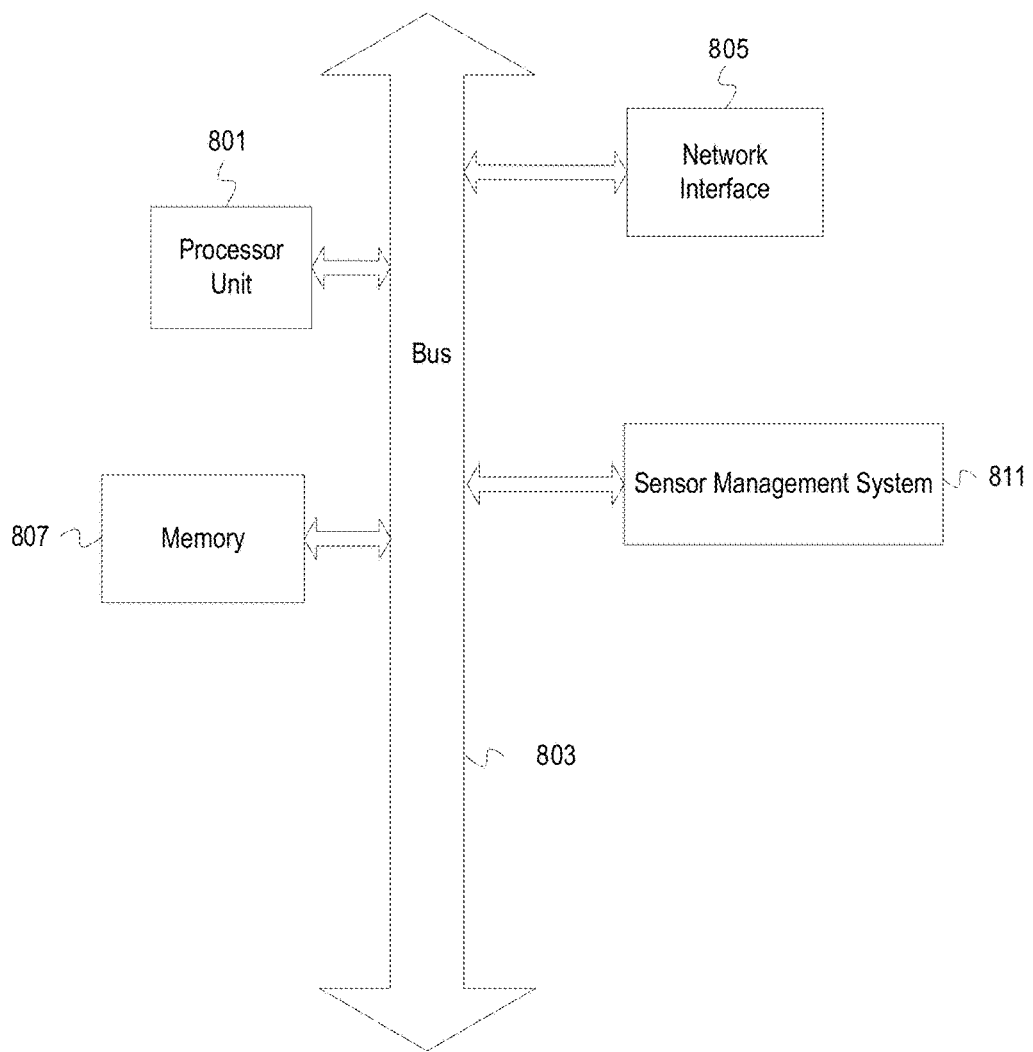
FIG. 8 depicts an example computer system with a sensor management system.

FIG. 8 depicts an example computer system with a sensor management system. The computer system includes a processor unit 801 (possibly including multiple processors, multiple cores, multiple nodes, and/or implementing multithreading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport® bus, InfiniBand® bus, NuBus, etc.) and a network interface 805 (e.g., a Fiber Channel interface, an Ethernet interface, an internet small computer system interface, SONET interface, wireless interface, etc.). The system also includes a sensor management system 811. The sensor management system 811 is capable of managing a network of location detection sensors, mapping location detection sensors within a physical space, and detecting and mitigating wardriving attempts using location detection sensors. Any one of the previously described functionalities may be partially (or entirely) implemented in hardware and/or on the processor unit 801. For example, the functionality may be implemented with an application specific integrated circuit, in logic implemented in the processor unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

Figure 9:
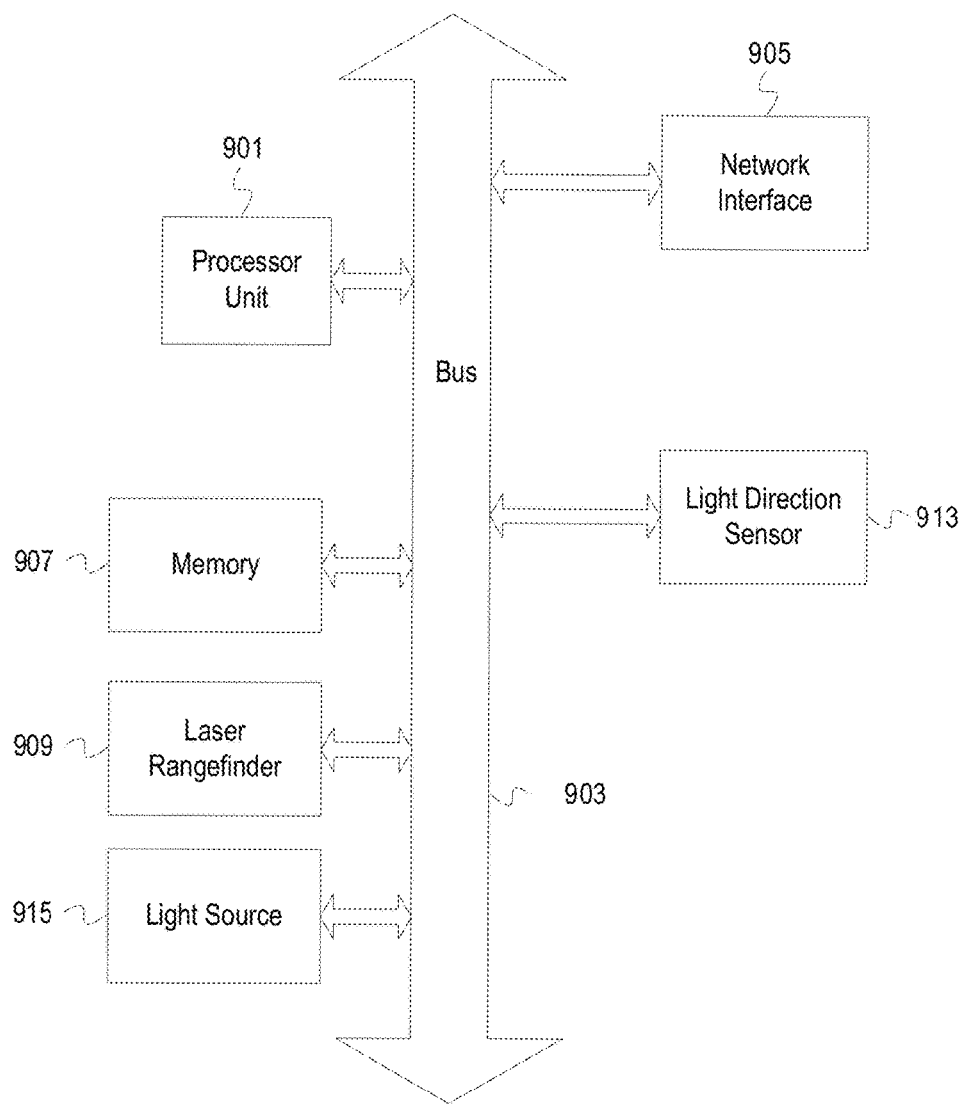
FIG. 9 depicts a system diagram for an example location detection sensor.

FIG. 9 depicts a system diagram for an example location detection sensor. The location detection sensor includes a processor unit 901 (possibly including multiple processors, multiple cores, multiple nodes, and/or implementing multithreading, etc.). The location detection sensor includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The location detection sensor also includes a bus 903 (e.g., PCI, ISA, PCI-Express, HyperTransport® bus, InfiniBand® bus, NuBus, etc.) and a network interface 905 (e.g., a Fiber Channel interface, an Ethernet interface, an internet small computer system interface, SONET interface, wireless interface, etc.). The location detection sensor also includes a laser rangefinder 909, a light direction sensor 913, and a light source 915. The location detection sensor may use the light direction sensor 913 to detect the direction of another location detection sensor and determine its distance using the laser rangefinder 909. The location detection sensor may also emit diffused light using the light source 915 to allow for detection by other location detection sensors. Any one of the previously described functionalities may be partially (or entirely) implemented in hardware and/or on the processor unit 901. For example, the functionality may be implemented with an application specific integrated circuit, in logic implemented in the processor unit 901, in a co-processor on a peripheral device or card, etc. Further, realizations may include fewer or additional components not illustrated in FIG. 9 (e.g., video cards, audio cards, additional network interfaces, peripheral devices, etc.). The processor unit 901 and the network interface 905 are coupled to the bus 903. Although illustrated as being coupled to the bus 903, the memory 907 may be coupled to the processor unit 901.

While the aspects of the disclosure are described with reference to various implementations and exploitations, it will be understood that these aspects are illustrative and that the scope of the claims is not limited to them. In general, techniques for establishing and managing a network of location detection sensors as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:
1. A method comprising:
controlling a plurality of sensors which emit and detect light to obtain relative location characteristics of the plurality of sensors based on the light detections;
retrieving a layout of a physical space, wherein the layout indicates dimensions of the physical space;

obtaining first location characteristics which comprise at least distance and orientation for a first sensor of the plurality of sensors in relation to a second sensor of the plurality of sensors;

mapping the first sensor and the second sensor to first potential locations within the physical space as constrained by at least the first location characteristics and the layout dimensions;

obtaining second location characteristics for a third sensor of the plurality of sensors in relation to at least one of the first sensor and the second sensor; and updating mapping of the first sensor and the second sensor within the physical space as constrained by at least the first location characteristics, the second location characteristics, and the layout dimensions.

2. The method of claim 1 further comprising:

identifying the first sensor as an origin of a coordinate grid;

determining an orientation for axes of the coordinate grid; and determining a coordinate location for the second sensor and the third sensor in relation to the first sensor.

3. The method of claim 2, wherein determining the coordinate location for the second sensor in relation to the first sensor comprises:

determining the orientation of the first location characteristics based, at least in part, on a direction of the second sensor in relation to the axes of the coordinate grid; and determining the coordinate location based, at least in part, on the distance and the orientation between the first sensor and the second sensor indicated in the first location characteristics.

4. The method of claim 2, wherein determining the orientation for the axes of the coordinate grid comprises selecting a direction of a first axis based, at least in part, on a compass direction determined by a gyroscope of the first sensor.

5. The method of claim 2 further comprising transmitting, by the first sensor, configuration information to the second sensor and the third sensor, wherein the configuration information includes the orientation for axes of the coordinate grid.

6. The method of claim 1, wherein mapping the first sensor and the second sensor to the first potential locations within the physical space as constrained by at least the first location characteristics and the layout dimensions comprises:

determining location constraints for the first sensor and the second sensor based, at least in part, on the first location characteristics; and identifying locations within the physical space that satisfy the location constraints based, at least in part, on the layout dimensions.

7. The method of claim 6, wherein determining the location constraints for the first sensor and the second sensor based, at least in part, on the first location characteristics comprises determining a minimum room size for the first sensor and the second sensor based, at least in part, on the distance between the first sensor and the second sensor indicated in the first location characteristics.

8. The method of claim 1, wherein the first location characteristics for the first sensors further comprise identification of sensors of the plurality of sensors which are within a line of sight of the first sensor.

9. The method of claim 1 further comprising using the mapping of the first and second sensors to the first potential locations within the physical space to assign at least one of the first sensor and the second sensor to a virtual group.

10. One or more non-transitory machine-readable storage media having program code for performing a location detection process stored therein, the program code to:

control a plurality of sensors which emit and detect light to obtain relative location characteristics of the plurality of sensors based on the light detections;

retrieve a layout of a physical space, wherein the layout indicates dimensions of the physical space;

obtain first location characteristics which comprise at least distance and orientation for a first sensor of the plurality of sensors in relation to a second sensor of the plurality of sensors;

map the first sensor and the second sensor to first potential locations within the physical space as constrained by at least the first location characteristics and the layout dimensions;

obtain second location characteristics for a third sensor of the plurality of sensors in relation to at least one of the first sensor and the second sensor; and update the mapping of the first sensor and the second sensor within the physical space as constrained by at least the first location characteristics, the second location characteristics, and the layout dimensions.

11. The machine-readable storage media of claim 10 further comprising program code to:

identify the first sensor as an origin of a coordinate grid;

determine an orientation for axes of the coordinate grid; and determine a coordinate location for the second sensor and the third sensor in relation to the first sensor.

12. An apparatus comprising:

a processor; and a non-transitory machine-readable medium having program code executable by the processor to cause the apparatus to, control a plurality of sensors which emit and detect light to obtain relative location characteristics of the plurality of sensors based on the light detections;

retrieve a layout of a physical space, wherein the layout indicates dimensions of the physical space;

obtain first location characteristics which comprise at least distance and orientation for a first sensor of the plurality of sensors in relation to a second sensor of the plurality of sensors;

map the first sensor and the second sensor to first potential locations within the physical space as constrained by at least the first location characteristics and the layout dimensions;

obtain second location characteristics for a third sensor of the plurality of sensors in relation to at least one of the first sensor and the second sensor; and update the mapping of the first sensor and the second sensor within the physical space as constrained by at least the first location characteristics, the second location characteristics, and the layout dimensions.

13. The apparatus of claim 12 further comprising program code executable by the processor to cause the apparatus to:

identify the first sensor as an origin of a coordinate grid;

determine an orientation for axes of the coordinate grid; and determine a coordinate location for the second sensor and the third sensor in relation to the first sensor.

14. The apparatus of claim 13, wherein the program code executable by the processor to cause the apparatus to determine the coordinate location for the second sensor in relation to the first sensor comprises program code executable by the processor to cause the apparatus to:
   determine the orientation of the first location characteristics based, at least in part, on a direction of the second sensor in relation to the axes of the coordinate grid; and
   determine the coordinate location based, at least in part, on the distance and the orientation between the first sensor and the second sensor indicated in the first location characteristics.

15. The apparatus of claim 13, wherein the program code executable by the processor to cause the apparatus to determine the orientation for the axes of the coordinate grid comprises program code executable by the processor to cause the apparatus to select a direction of a first axis based, at least in part, on a compass direction determined by a gyroscope of the first sensor.

16. The apparatus of claim 13 further comprising program code executable by the processor to cause the apparatus to transmit configuration information to the second sensor and the third sensor, wherein the configuration information includes the orientation for axes of the coordinate grid.

17. The apparatus of claim 12, wherein the program code executable by the processor to cause the apparatus to map the first sensor and the second sensor to the first potential locations within the physical space as constrained by the first location characteristics and the layout dimensions comprises program code executable by the processor to cause the apparatus to:
   determine location constraints for the first sensor and the second sensor based, at least in part, on the first location characteristics; and
   identify locations within the physical space that satisfy the location constraints based, at least in part, on the layout dimensions.

18. The apparatus of claim 17, wherein the program code executable by the processor to cause the apparatus to determine the location constraints for the first sensor and the second sensor based, at least in part, on the first location characteristics comprises program code executable by the processor to cause the apparatus to determine a minimum room size for the first sensor and the second sensor based, at least in part, on the distance between the first sensor and the second sensor indicated in the first location characteristics.

19. The apparatus of claim 12, wherein the first location characteristics for the first sensor further comprise identification of sensors of the plurality of sensors which are within a line of sight of the first sensor.

20. The apparatus of claim 12 further comprising program code executable by the processor to cause the apparatus to use mappings of the first and second sensors to the first potential locations within the physical space to assign at least one of the first sensor and the second sensor to a virtual group.

* * * * *